(12) United States Patent
Urban

(10) Patent No.: US 11,720,849 B2
(45) Date of Patent: Aug. 8, 2023

(54) METHOD AND SYSTEM FOR MANAGING NAVIGATIONAL DATA FOR AUTONOMOUS VEHICLES

(71) Applicant: Corverity Corporation, San Francisco, CA (US)

(72) Inventor: Joseph Urban, San Francisco, CA (US)

(73) Assignee: Corverity Corporation, San Francisco, CA (US)

( * ) Notice: Subject to any disclaimer, the term of this patent is extended or adjusted under 35 U.S.C. 154(b) by 210 days.

(21) Appl. No.: 16/586,570

(22) Filed: Sep. 27, 2019

(65) Prior Publication Data

US 2020/0158508 A1 May 21, 2020

Related U.S. Application Data

(60) Provisional application No. 62/767,706, filed on Nov. 15, 2018.

(51) Int. Cl.
| | | |
|---|---|---|
| *G06Q 10/0834* | (2023.01) | |
| *H04L 67/12* | (2022.01) | |
| *B64C 39/02* | (2023.01) | |
| *B64F 1/00* | (2006.01) | |
| *G01C 21/20* | (2006.01) | |

(Continued)

(52) U.S. Cl.
CPC ....... *G06Q 10/0834* (2013.01); *B64C 39/024* (2013.01); *B64F 1/00* (2013.01); *G01C 21/20* (2013.01); *H04L 67/12* (2013.01); *B64U 10/13* (2023.01); *B64U 2101/60* (2023.01); *B64U 2201/10* (2023.01); *G05D 1/0088* (2013.01)

(58) Field of Classification Search
CPC ................................................. G06Q 10/0834
See application file for complete search history.

(56) References Cited

U.S. PATENT DOCUMENTS

| | | |
|---|---|---|
| 6,122,572 A | 9/2000 | Yavnai |
| 6,269,763 B1 | 8/2001 | Woodland |

(Continued)

FOREIGN PATENT DOCUMENTS

EP     3251108 A1 * 12/2017    ............. G08G 5/006

OTHER PUBLICATIONS

NPL, Nuno, Paula et al., Muti-drone Control with Autonomous Mission Support, UNAGI'19—Workshop on Unmanned aerial vehicle Applications in the Smart City: from Guidance technology to enhanced system Interaction (https://ieeexplore.ieee.org/stamp/stamp.jsp?tp=&arnumber=8730844)(Mar. 11, 2019).*

(Continued)

*Primary Examiner* — Jean Paul Cass
(74) *Attorney, Agent, or Firm* — Rowan TELS LLC

(57) ABSTRACT

Methods and systems of prescribing navigational instructions to autonomous vehicle, aerial as well as terrestrial, are discussed. In one embodiment, mission relevant data is collected and passed to an assessment unit. The assessment unit assess data relevant to the mission, rules and authorizations. The assessment unit either approves the mission by sending mission instructions or denies the mission by sending a rejection response. A mission is an assembly of one or more navigational containers, a navigational container being a repository for navigational guidance and rule-based authorization assessment.

4 Claims, 12 Drawing Sheets

(51) Int. Cl.
  *G05D 1/00* (2006.01)
  *B64U 10/13* (2023.01)
  *B64U 101/60* (2023.01)

(56) References Cited

U.S. PATENT DOCUMENTS

| | | | |
|---|---|---|---|
| 8,880,270 | B1 | 11/2014 | Ferguson et al. |
| 8,996,224 | B1 | 3/2015 | Herbach et al. |
| 9,488,979 | B1 | 11/2016 | Chambers et al. |
| 9,815,633 | B1* | 11/2017 | Kisser .................. B65G 37/02 |
| 9,833,901 | B2 | 12/2017 | Perrone |
| 9,990,854 | B1 | 6/2018 | Elmasry et al. |
| 10,497,267 | B2 | 12/2019 | Bosworth |
| 10,613,536 | B1 | 4/2020 | Lathia et al. |
| 2006/0265234 | A1 | 11/2006 | Peterkofsky et al. |
| 2007/0061053 | A1 | 3/2007 | Zeitzew |
| 2010/0312388 | A1 | 12/2010 | Jang et al. |
| 2011/0283285 | A1 | 11/2011 | Saad et al. |
| 2013/0054024 | A1 | 2/2013 | Bruemmer et al. |
| 2014/0032034 | A1* | 1/2014 | Raptopoulos ...... H04B 7/18506 701/25 |
| 2014/0081505 | A1 | 3/2014 | Klinger et al. |
| 2015/0142211 | A1* | 5/2015 | Shehata ............... G08G 5/0069 701/2 |
| 2015/0232064 | A1 | 8/2015 | Cudak et al. |
| 2015/0234387 | A1 | 8/2015 | Mullan et al. |
| 2016/0068264 | A1 | 3/2016 | Ganesh et al. |
| 2016/0140851 | A1 | 5/2016 | Levy et al. |
| 2016/0142211 | A1* | 5/2016 | Metke .................. H04L 9/3268 713/175 |
| 2016/0200421 | A1* | 7/2016 | Morrison ............... B64D 27/24 244/17.23 |
| 2016/0260331 | A1 | 9/2016 | Salentiny et al. |
| 2016/0275801 | A1 | 9/2016 | Kopardekar |
| 2016/0314429 | A1 | 10/2016 | Gillen et al. |
| 2016/0370800 | A1 | 12/2016 | Chau et al. |
| 2017/0108876 | A1 | 4/2017 | Mullan et al. |
| 2017/0116566 | A1 | 4/2017 | Walton |
| 2017/0124789 | A1 | 5/2017 | Rephlo |
| 2017/0270468 | A1 | 9/2017 | Natarajan et al. |
| 2017/0295458 | A1* | 10/2017 | Gao ....................... H04W 64/00 |
| 2018/0046201 | A1* | 2/2018 | Erickson ................ G01C 21/34 |
| 2018/0114174 | A1 | 4/2018 | Boland et al. |
| 2018/0232693 | A1 | 8/2018 | Gillen et al. |
| 2019/0329877 | A1* | 10/2019 | Benson .................. B64C 11/28 |
| 2020/0158508 | A1 | 5/2020 | Urban |
| 2020/0160265 | A1 | 5/2020 | Urban |
| 2020/0301445 | A1* | 9/2020 | Jourdan ................. B64U 30/20 |

OTHER PUBLICATIONS

Gilabert, Russell, SafeGuard, Progress and Test Results for a Reliable Independent on board safety net for a UAS, Safety-critical Avionics Systems Branch, NASA Langley Research Center, Hampton VA, (https://ieeexplore.ieee.org/stamp/stamp.jsp?tp=& arnumber= 8102087) (2017 (Year: 2017).*
PCT/US19/61825 International Search Report dated Apr. 1, 2020.
PCT/US19/61825 Written Opinion dated Apr. 1, 2020.
PCT/US19/61560 International Search Report dated Feb. 18, 2020.
PCT/US19/61825 Written Opinion.
Besada Juan et al: "Drone Mission Definition and Implementation for Automated Infrastructure Inspection Using Airborne Sensors", Sensors, vol. 18, No. 4, Apr. 11, 2018 (Apr. 11, 2018), pp. 1-29, XP055915765, DOI: 10.3390/s18041170, abstract; figures 1,3,5, pp. 5-6, pp. 7-12, pp. 17-19, p. 25.
NPL 19883649.6 EuropeanSearchReport dated May 12, 2022.
198836496 European Search Report dated Jul. 28, 2022.

* cited by examiner

METHOD AND SYSTEM FOR MANAGING NAVIGATIONAL DATA FOR AUTONOMOUS VEHICLES

CROSS-REFERENCE TO RELATED APPLICATIONS

This application claims the benefit of U.S. provisional patent application Ser. No. 62/767,706, filed on Nov. 15, 2018, the contents of which are incorporated herein by reference in their entirety.

BACKGROUND

Embodiments of the present invention generally relate to computerized vehicle controls and navigation, radio wave, optical and acoustic wave communication, robotics, and nuclear systems. More particularly, embodiments of the present invention relate to methods or systems for providing navigational instructions to aerial and terrestrial autonomous vehicles.

In the field of autonomous aerial and terrestrial vehicles, there is generally no means to determine the most optimal and reliable path to navigate to a destination. There is also no automated means for a local authority to advise an autonomous vehicle on how to best navigate across each segment of its journey to a location or to control what device or what operator controlling the device is allowed to navigate through any given space or through a location. Further, there is no means for the automated assembly of complex routes based on local laws and rules.

Because of aforementioned issues in automating the navigation of aerial and terrestrial vehicles, a mission operator may experience a poor mission experience, thereby contributing to mission failure, and/or excessive costs to the mission operator, and/or violation of the regulations and policies of a supervising authority.

BRIEF SUMMARY

The disclosure resolves many issues related to violation of local regulations and politics, mission failure and excessive mission cost in the field of autonomous vehicles, including autonomous aerial and terrestrial vehicles.

In one embodiment, the disclosure is a method of implementing a mission with an autonomous entity, comprising, initiating, by a mission operator, a request for routing authorization and routing instructions, and collecting, by the mission operator, relevant mission attributes, wherein the relevant mission attributes are selected from mission operator attributes, mission attributes, autonomous entity attributes, and payload attributes.

The method further comprises passing the relevant mission attributes to an assessment unit, identifying navigational containers using the relevant mission attributes, collecting policies, rules, and authorizations from the navigational containers, and executing an assessment of the navigational containers using the assessment unit. The assessment unit includes logical instructions to determine if the navigational containers may be authorized to be used by the mission operator. The logical instructions comprise, assessing, using the mission attributes, rules, and authorizations if the rules and authorizations are approved for the mission using at least one navigational container. The mission includes operations of the autonomous entity.

Further, the method comprises, on condition that the at least one navigational container is approved for the mission, collecting navigational instructions from the at least one navigational container to assemble mission instructions, assembling the mission instructions, and sending the mission instructions to the mission operator. The method further comprises, on condition that the assessment does not approve the at least one navigational container for the mission, sending a rejection response to the mission operator.

In another embodiment, the present invention is a system. In a further embodiment, the present invention is a non-transitory computer-readable physical medium.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
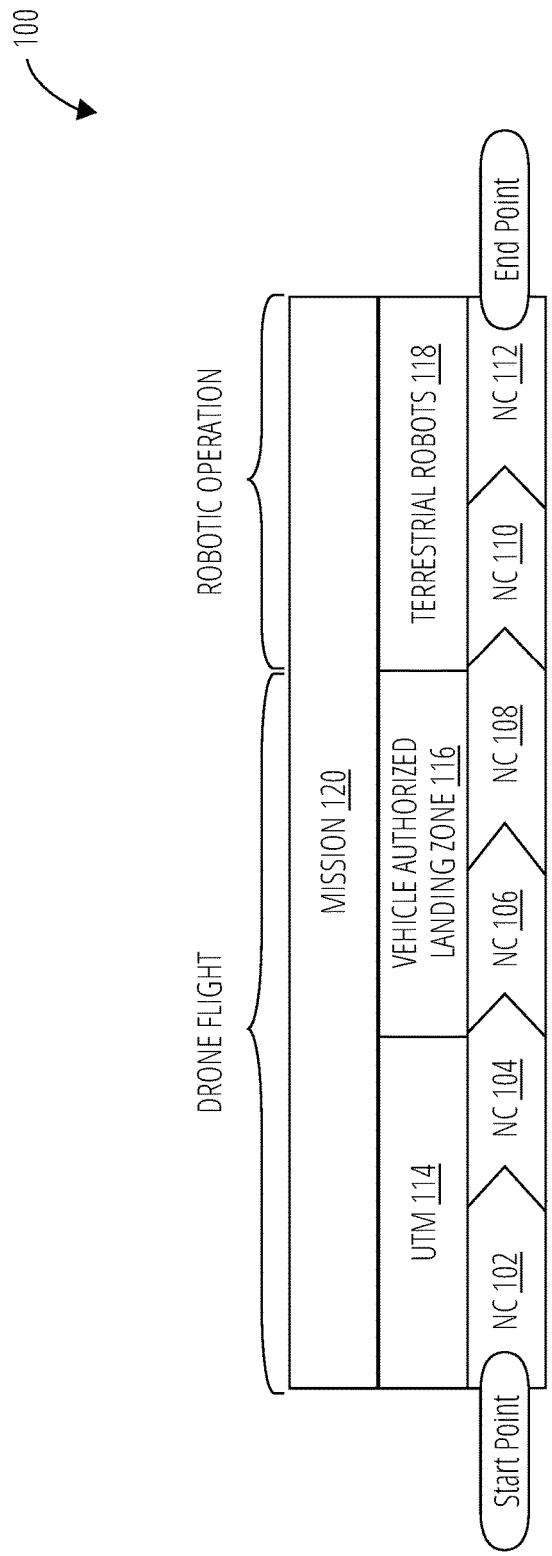
FIG. 1 illustrates a mission assembly 100 in accordance with one embodiment.

"Assessment unit" refers to logic to assess the authorizations configured in an NC, and assess the attributes of a drone, operator and payload and time window requested to operate through the NC.

"Authorizations" refers to the identity of the operators that have been authorized to use the instructional data within the NC.

"Autonomous entity" refers to an autonomous device or person used to carry out a mission.

"JSON" refers to JSON is a language-independent data format. It was derived from JavaScript, but many modern programming languages include code to generate and parse JSON-format data.

"Logical instructions" refers to instructions to assess, using the mission attributes, policies, rules, and authorizations, if the policies, rules, and authorizations are approved for a mission using at least one navigational container.

"Mission" refers to a definition of the sequential actions taken by an automated entity, or multiple automated entities, from start to finish, to deliver a payload.

"Mission assembly" refers to an assembly of a plurality of navigational containers "Mission instructions" refers to instructions needed to execute a mission. Instructions may include sequential actions to be taken from beginning of the mission to end.

"Mission operator" refers to an operator of an autonomous entity.

"Navigational containers" refers to a collection of data that is used to govern and guide the operator (mission operator) and navigational system of an autonomous entity. Also referred to as NC or NCs.

"Navigational instructions" refers to includes data on how to operate the autonomous vehicle within a specific geography.

"NC" refers to navigational container

"NCs" refers to Navigational containers

"Operator" refers to a mission operator

"Policies" refers to a form of rules. Policies may be static and/or conditional.

"RDBMS" refers to Relational database management system

"Regulations" refers to a type of policy that may be owned and administered by governmental authorities "Relevant mission attributes" refers to Mission operator attributes, mission attributes, autonomous entity attributes, and payload attributes.

"Rules" refers to an automated method to determine if an operator and autonomous entity is capable and authorized to use the navigational instructions included in the navigational container.

"UI" refers to user interface

"UTM" refers to the Unmanned aerial Vehicle Management system that acts as a traffic management system for aerial drones and provides a means to interface with nearby air traffic management systems.

In the following description, for purposes of explanation, numerous specific details are set forth in order to provide a thorough understanding of the invention. It will be apparent, however, to one skilled in the art that the invention may be practiced without these specific details. In other instances, structures, devices, activities, and methods are shown using schematic, use case, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

The disclosure is directed to resolving many of the issues that may lead to mission failure, excessive mission costs, and violation of the regulations and policies of a supervising authority in the field of autonomous aerial and terrestrial vehicles.

In one embodiment, a method is disclosed to prescribe navigational instructions for aerial and terrestrial autonomous vehicles and to assess if a requester is authorized to receive said instructions, and whether the requester's navigational mission is within the regulations and policies of the supervising authority over the region defined within said instructions.

In an embodiment, a method is disclosed of implementing a mission with an autonomous entity, comprising, initiating, by a mission operator, a request for routing authorization and routing instructions, and collecting, by the mission operator, relevant mission attributes. The relevant mission attributes are selected from mission operator attributes, route attributes, autonomous entity attributes, and payload attributes.

The method further comprises, passing the relevant mission attributes to an assessment unit, identifying navigational containers using the relevant mission attributes, collecting policies, rules, and authorizations from the navigational containers, and executing an assessment of the navigational containers using the assessment unit. The assessment unit includes logical instructions to determine if the navigational containers are authorized. The logical instructions comprise, assessing, using the mission attributes, rules, and authorizations if the rules and authorizations are approved for the mission using at least one navigational container. The mission includes operations of the autonomous entity.

Further, the method comprises, on condition that the at least one navigational container is approved for the mission, collecting navigational instructions from the at least one navigational container to assemble mission instructions, assembling the mission instructions, and sending the mission instructions to the mission operator. The method further comprises, on condition that the assessment does not approve the at least one navigational container for the mission, sending a rejection response to the mission operator.

In another embodiment, the disclosure is directed to a system. In another embodiment, the disclosure is directed to a non-transitory computer-readable physical medium. In one embodiment, an autonomous vehicle may utilize maps. In another embodiment, an autonomous vehicle may use situational awareness to navigate. Further embodiments are discussed below.

The language in the embodiments below are context-specific and relevant to a mission, and should not be construed to limit the broader spirit of the disclosure.

The navigational container (hereinafter, "NC" or "NCs" for plurality) is a stand-alone collection of data that provides sufficient guidance and governance to an automated vehicle over a specific geography or transition point. Each space may be occupied by a single NC. Each NC may have a single owner that can administer its attributes except those inherited by a higher authority such as a governmental authority or regional administrator. There can be multiple levels of authorities each of which can administer attributes at their level and which are inherited from each higher authority. Each NC may have one or more authorized users that can allow access to the navigational instructions. Each NC may have autonomous device operators, or references to autonomous device operators or groups of autonomous device operators, that are authorized to utilize the navigational instructions for their autonomous vehicles. NCs can be stacked together to create a mission. This stack of NCs may include branches that are routed through as a result of the rules that are managed within the NC.

NCs may be stacked together to assemble a mission. A mission is a macro operation that moves a payload from start to finish. There are two forms of NCs: Hub and Spoke. Hub NCs serve to initiate and terminate a mission. They also provide an interface between Spoke NCs. Spoke NCs contain information necessary for an autonomous vehicle to navigate across any distance. In an embodiment, every Spoke NC has a Hub NC on either end. The results of that navigation may be used by the next Hub NC to determine a subsequent action. In a most simple scenario, that action will be to direct the navigation to another Spoke NC.

NCs may be grouped by ownership and function.

Ownership determines what entity owns and has control over the attributes within the scope of authorization granted by a local governmental authority. The assignment of ownership is determined by potential co-use and proximity to other NCs and people (i.e., neighbors). Public NCs may include NCs that traverse public spaces and may be used by more than one device and operator. Private NCs include all NCs that are exposed to the public but are predominantly within the geography of a private property. These NCs may inherit regulations assigned by the local public authority because they may impact the public. Supervised NCs may include NCs that are not exposed to the public or individuals outside of the people associated with the owner or the organization the agent represents. These will typically be inside of a building or on a restricted campus.

Function may determine how an NC is used as a structure of the mission. While the structure of the NC may be similar, its position within the mission may determine its functional type. In an embodiment, a Hub is a first and a last NC in a mission. Hub NCs may also be decision points along a mission and provide prescribed routing options for both a planned route and destination as well as all predefined contingencies. Spoke defines a distance traveled by the device. In many embodiments, Spoke NCs are connected to Hub NCs.

Navigational flows may also branch based on outcomes from executing Spoke NCs. This branching may be determined by the Hub NC positioned at the terminus of a Spoke NC.

A mission may use static as well as dynamic data. Mission-Static data may be relevant to Hub NCs that may need data from a mission to be properly configured. This may be primarily due to the flexibility of Hub NCs to route to multiple Spoke NCs and a mission has to define the default Spoke NC as a continuation.

Mission-Dynamic data may be relevant to NCs that may leverage data that is generated during a mission itself. This may assume that an autonomous device's sensors and/or operating system are collecting data that may be generated during the mission itself. This data may be used to alter the outcome of a Hub NC. For example, if an autonomous device is unable to finish a procedure within its allotted time, the connecting Hub NC instructs the autonomous device to take an alternative Spoke NC and land at a staging area to await further instructions. In this example, the device would avoid encountering another autonomous device and decrease the risk of an impact.

In an embodiment, a collection of meta data, typically described as a header, relevant as to each NC may comprise a set of required global attributes: Serial Number, a unique identifier, used as the inbound pointer by Point NCs; an identifier that defines if the NC is a point definition (Hub NC) or a segment of travel definition (Spoke NC); and a combined geocode and altitude set of values of the point-of-entry and the terminus. This may allow for assessment across NCs when de-conflicting trajectories to be executed by multiple autonomous devices. A Hub NC may have a same point-of-entry and terminus values. A Hub NC may also have a set of instructions to be executed at that location that do not include changing the position of the autonomous device. Examples may include a set of instructions to open a door, operate an elevator, or engage another Hub NC in the same location.

Rules may be used to coordinate the logic by which an NC is authorized, executed and routed. They may be initiated at the meta data level (header) or within navigational instructions. They may provide guidance on authorization, tuning of navigational instructions and routing to subsequent NCs (such as exception management). Rules may also be inherited. The logic guiding inheritance may be based on the geography and type of NC. An example of an inherited rule is a state-government-wide policy that requires that only certified operators can access public NC's. All public NC's may assess if an operator has a certificate on record before approval on the use of the NC. Rules may be stored outside of the NC and pointers managed within the NC will reference the rule. This allows for one rule to be used multiple times and its management can be centralized.

A required rule in Hub NCs may be to determine how to point to the next NC if the navigational instructions are successful. There may be a default NC that is executed if the instructions are successfully executed. A Hub NC that is defined as a terminus may allow the outbound pointer to be left null. Alternatively, this terminus definition may be identified by the value of the outbound pointer to the subsequent Spoke NC. Alternative routes to NCs may be pre-established based on the outcome of the navigational instructions.

Rules include policies and regulations, and may have variables whose values are managed external to the NC. These values may be managed through group assignments. That allows for group-level adjustments to the values (e.g., change the time allowed for using the containers in an entire neighborhood) and flexibility to assign different values to the same rule across different groups. These external values may also be updated by upstream sources or algorithms.

Counts and reports of assignments-to-containers of rules may be tracked so that the operator/administrator knows the consequences of adjusting the rule. Rules may be stored in a generically-readable format, such as JSON, in the container, but may be maintained in an RDBMS, or an equivalent storage system such as a blockchain, that provides the data for the maintenance and creation UI. This may allow fast consumption for rules and establishes a separate system for secure management. The RDBMS points to the master rule table, which is used to build the container-level JSON. JSON and an RDBMS are only examples of the data format and storage systems that may be used, and are not limited thereto. Any data format or storage system may be used that is compatible with the methods, systems, and media in this disclosure.

Policies may be a form of rules. Policies may be static and conditional. Static refers to simple values associated with a standard parameter. These values may be used against centrally-managed, standardized policy rules. An "available time of operation" is a static example. The variable is managed as an externally-referenced value. Conditional refers to a contextual rule that may leverage a formula or logic statement and uses values that are configured externally to the policy. For example, a rate-limiter may reference the total count of scheduled uses of the container over a rolling time window, compare it to a configured value, and deny the container's use during a requested time even if no other device is scheduled for that time. This example would enable the local authority to moderate the quantity of autonomous devices using the space in order to comply with public sentiment. Policies may be configured in one system and assigned to a navigational container via another system. They may then be reused, shared and managed independently of any one navigational container.

Regulations may be a type of policy (which is also a type of rule) that may be owned and administered by governmental authorities. They may be labeled as regulations, but act as policies. Governmental authorities may assign a regulatory label to a policy. Regulation-flagged policies may be automatically assigned to containers based on rules. External and public NCs may inherit the local regulation policies defined by the local government regardless of the owner. Interior and non-public NCs may not inherit any policies by default, but may be configured to do so by the administrator. A private parking garage assigning hours of operation is an example. NCs can be assigned to one or more groups. These can be used to query assigned NCs, implement mass adjustments to associated values or re-assign policies or owners (i.e. all of the metadata).

Navigational instructions (instructions) from each container are assembled sequentially before being passed to a carrier. They may not need to know policies, ownership and authorizations. The instructions may use a generically-readable format, such as a JSON protocol. The instructions can be nested and complex. Instructions have a trigger (entry point) and a terminus (exit point). These may be physical or logical. Passwords and other secure data may be stored within the instructions but may be hashed (a decryption method that is defined).

A navigational container pointer refers to a unique identifier, such as a serial number, of a navigational container that is an inbound pointer referenced by upstream containers in a mission. The downstream pointers may be determined by the outcome of rules. A successful navigation to the terminating boundary may use a default downstream pointer. Navigational container pointers may have all missions assess if all downstream pointers are associated with an active container that can be used by the requesting party. Unless the NC is a terminating point in the mission, there may always be a default downstream pointer. This may be defined within the navigational instructions or as a metal data definition. Navigational instructions may override the meta data definitions.

Ownership refers to a primary owner of a navigational container. A primary owner is the default administrator during creation. But there can be more than one administrator, and the owner can be removed from the administrator role. A higher authority (e.g., local government) may reestablish the owner's administrative role. For public NCs, if the owner needs to be changed, an authorized agent of a local government would typically be engaged to make a change.

Authorization may be relevant in a manner that a primary owner can override any administrator but cannot override an agent of the local government with jurisdiction. The administrator can adjust any attribute except those required by the local governmental authority and the owner. The authorization status may be used as a flag to disable the navigational container. The authorization status may also be triggered by administrative processes that take action based on rules and groups.

Messaging and alerts may be relevant in a manner that success messages are configured in a navigational container. It may not be assumed that success messages are used to trigger anything and are rarely used and optional. Policy result messages may be standardized, but can be overridden by the container.

FIG. 1 is a mission assembly 100 in accordance with an exemplary embodiment. Such a mission 102 may comprise delivering a payload from a starting point, such as a warehouse, to an endpoint in a building. Mission 102 may be intended to be accomplished by a combination of different types of autonomous device operations such as aerial drones and terrestrial robots, multiple aerial drones, multiple terrestrial robots, or any combination thereof.

In an embodiment, mission 102 may require actions involving Unmanned Traffic Management or UTM 104, a vehicle authorized landing zone 106, and terrestrial robots 108. Mission 102 may comprise an assembly of a plurality of navigational containers or NCs. Mission 102 may begin at a start point, such as a warehouse, may end at an end point, such as the floor of an office, and may comprise navigational containers NC 110, NC 112, NC 114, NC 116, NC 118, and NC 120. For the sake of simplicity, the quantity of NCs in FIG. 1 are lower than an actual mission.

NC 110 may include data defining a UTM route out of the warehouse. NC 112 may comprise information relevant to a target altitude and geocode. NC 114 may define an authorized landing zone entry. NC 116 may comprise information relevant to a specific landing spot. These NCs may provide all data needed for the operation of drone flight to complete an initial portion of mission 102.

Next, NC 118 may comprise information relevant to entering a building. NC 120 may comprise information relevant to a specific hallway. In this manner, NC 118 and NC 120 may comprise all of the data necessary for the mission 102 to be completed through robotic operation, ending at the appropriate office desk or location on the floor.

Figure 2:
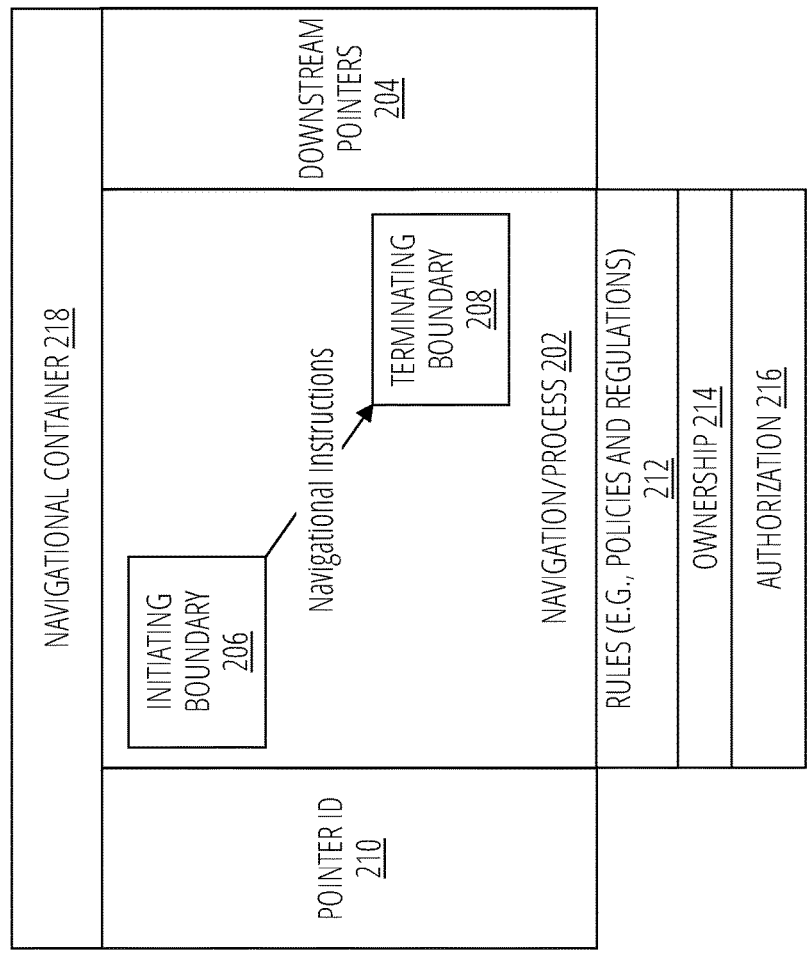
FIG. 2 illustrates a navigational container 200 in accordance with one embodiment.

FIG. 2 is a navigational container 200 showing a navigational container 202 in accordance with one embodiment. The navigational container 202 comprises pointer ID 204, navigation/process 206, and downstream pointers 208. Navigation/process 206 comprises the steps of starting at an initiating boundary 210 and ending at a terminating boundary 212, with the aid of navigational instructions. The navigational container 202 further comprises rules (e.g., policies and regulations) 214, ownership 216, and authorization 218. Pointer ID 204 comprises a unique identification such as a serial number. Downstream pointers 208 are context driven and may comprise branching. Branching is explained more in the disclosure below.

Navigational container 202 or NC may also be defined as an object with metadata. Metadata comprises rules (e.g., policies and regulations) 214, ownership 216, and authorization 218. Rules may be reviewed to take generic actions to pass to a carrier to execute a mission. Rules include policies and regulations. Policies may be a group of rules considered in view of business or regulations. Regulations may be policies that are managed by local authorities and may be instantiated in legislation. Collectively, rules (e.g., policies and regulations) 214 may also be referred to as rules and derived policies and regulations. Authorization 218 may be assessed based on rules or coded data such as identity of a carrier. Ownership 216 may fall under administration and may be relevant to who has rights to make adjustment to rules.

To further illustrate, navigational container 202 is a collection of data that is used to govern and guide the operator (mission operator) and navigational system of an autonomous vehicle, such as a drone. The rules provide an automated method to determine if an operator and an autonomous vehicle is capable and authorized to use the navigational instructions included in the navigational container 202. Ultimately, the navigational instructions stored in the navigation/process 206 will be forwarded to the operator. Navigational instructions include data on how to operate the autonomous vehicle within that specific geography. The decision to allow that data to be sent is determined by assessing the authorization 218 configured in the navigational container 202, and assessing the attributes of the drone, operator and payload and time window requested to operate through the NC. The outcome of the navigational process is a lookup of downstream pointers 208 that will determine what (or if) another navigational container is to be engaged in order to continue the mission.

To further illustrate, each navigational container comprises data sections. Data sections may comprise the following (a) to (d).

(a) Meta Data: Each navigational container has global data that applies to a mission or autonomous vehicle. Global data may be any data that is relevant to completing a mission. A unique identifier for a navigational container may comprise a container identity. Container types refer to two types of containers that are defined as a hub navigational container or spoke navigational container. If a hub navigational container, it may begin with an H. If a spoke navigational container, it may begin with an S. This field is available for ease of use as it is possible to extrapolate the container type, such as, by using the container identity's first letter (H or S). A container time zone may provide a way to extrapolate from the UTC absolute time or use the UTC absolute time as a common reference. This is especially important if the mission crosses time zones. The container entry location may be relevant in a manner that all NC's may exist in space. There may also be an entry and exit point in space. In order for the instructions to work as anticipated, the device must first be at an entry location. Time elapse is relevant in a manner that the available time slots for each NC is extrapolated by adding up the time elapsed by each prior NC. Maximum speed is the top speed limit. This may be used to ensure that the local rules can be referenced and that the time elapse is within a reasonable tolerance of the time frame. Minimum speed is the slowest speed allowed. If a device cannot sustain this speed through each NC with the available battery capacity, the operator may not use it for that mission.

(b) Authorizations: These define the identity of the operators that have been authorized to use the instructional data within an NC. This is one of the first assessments that is done on the container's rules.

(c) Administration: These are the entities that can view the settings and rules, or view/edit them.

(d) Rules: These are the assessments that are executed to determine if an operator would be allowed to execute that particular mission after they have been identified as an authorized operator. It is possible that there are no rules in a NC and thus may not require any assessment.

Figure 3:
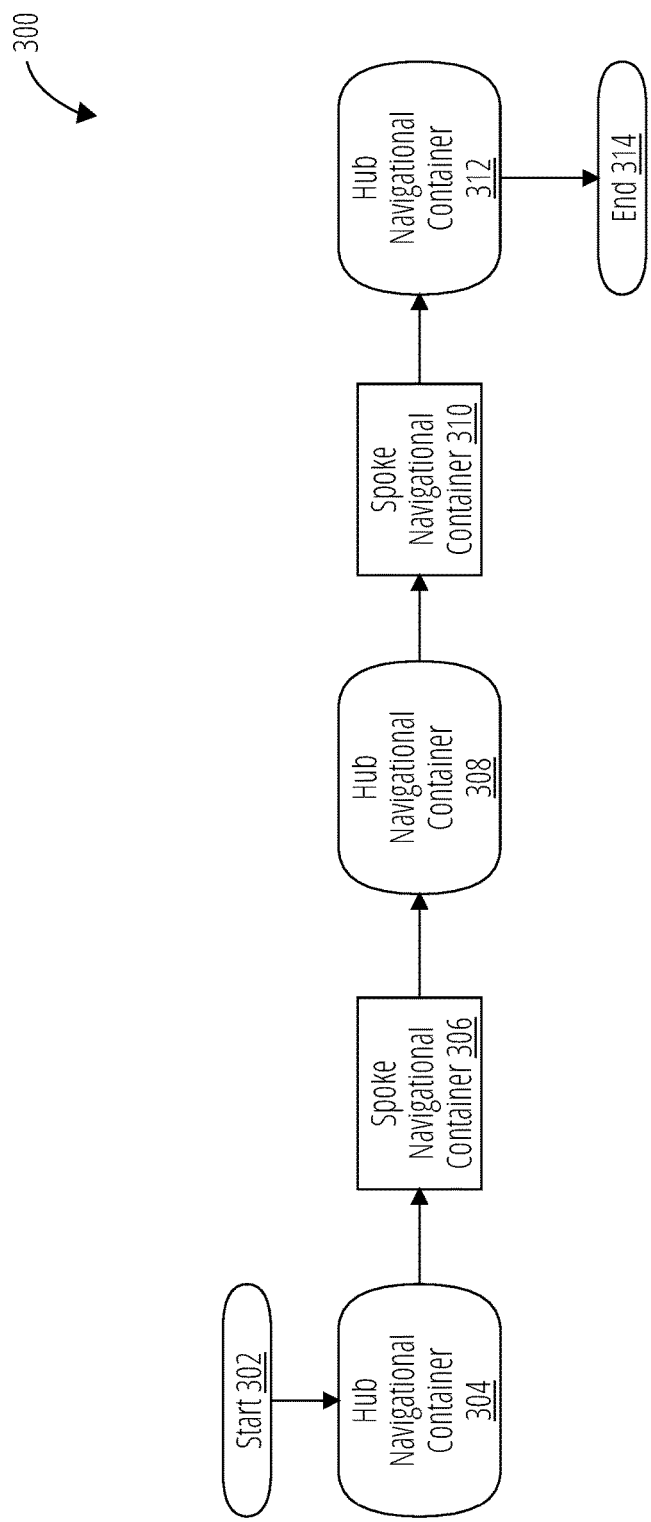
FIG. 3 illustrates types of navigational containers 300 in accordance with one embodiment.

Referring to FIG. 3, a predefined mission may be comprised of a multitude of navigational containers 300 and may include hub navigational containers (Hub NCs) and spoke navigational containers (Spoke NCs) in accordance with one embodiment. A mission begins at Start 302 with a hub navigational container 304. Spoke navigational container 306 contains information necessary for the mission to travel between the hub navigational container 304 and hub navigational container 308. Spoke navigational container 310 contains information necessary for the mission to travel between the hub navigational container 308 and a hub navigational container 312. The mission completes at End 314.

Figure 4:
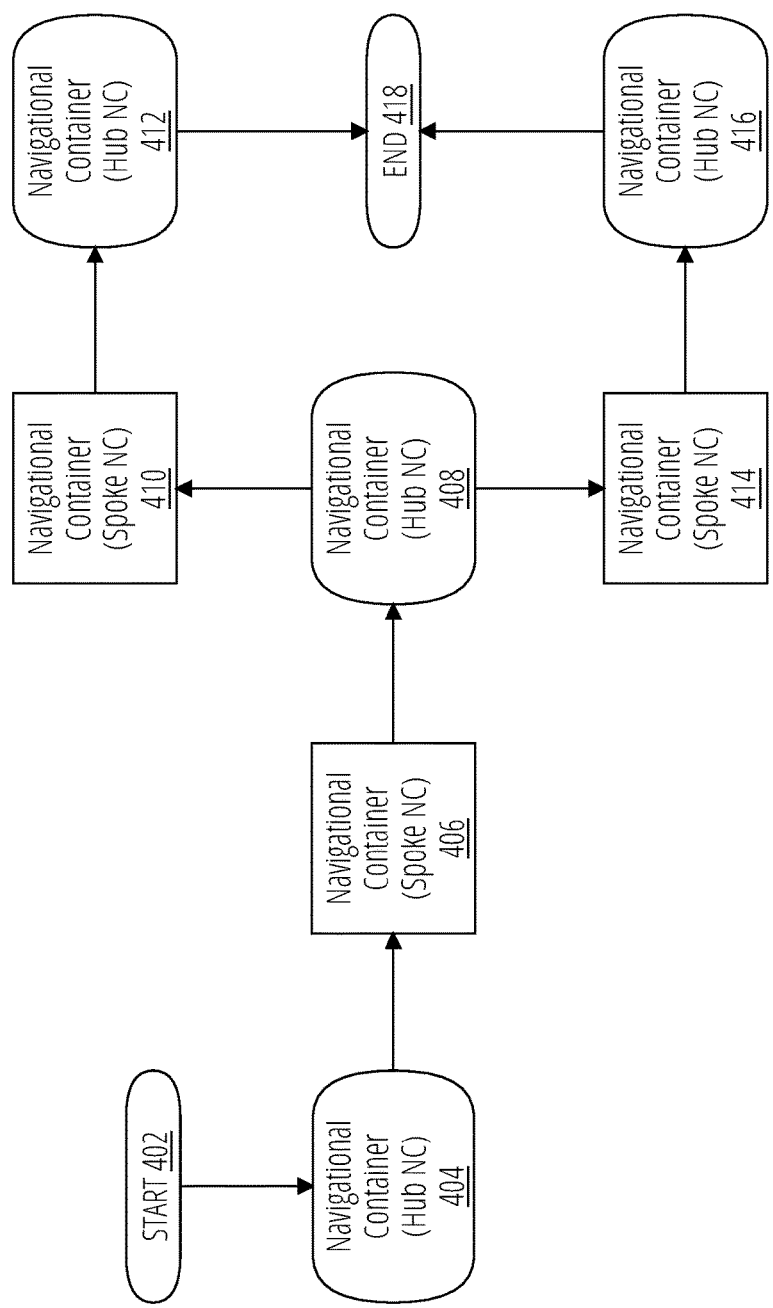
FIG. 4 illustrates branched navigational flows 400 in accordance with one embodiment.

Referring to FIG. 4, branched navigational flows 400 of a predefined mission are shown in accordance with one embodiment. A mission begins at Start 402 with Navigational Container (Hub NC) 404. Navigational Container (Spoke NC) 406 contains information necessary for the mission to travel between the Navigational Container (Hub NC) 404 and Navigational Container (Hub NC) 408. Branching occurs at the Navigational Container (Hub NC) 408, a decision point where two spokes are branched: Navigational Container (Spoke NC) 410 and Navigational Container (Spoke NC) 414. At the decision point Navigational Container (Hub NC) 408, the autonomous vehicle decides which branch to follow.

The branched Navigational Container (Spoke NC) 410 joins Navigational Container (Hub NC) 412. The branched Navigational Container (Spoke NC) 414 joins Navigational Container (Hub NC) 416. The mission for both Navigational Container (Hub NC) 412 and Navigational Container (Hub NC) 416 completes at End 418.

Navigational flows may also branch based on outcomes from executing Spoke NCs. The branching may be determined by a Hub NC positioned at the terminus of a Spoke NC. An example of an outcome that changes the downstream Spoke NC is if the device arrives at the Hub NC 408 later than the configured end time. In this example the secondary branch would be used to park the autonomous device and await instructions on how to proceed.

Figure 5:
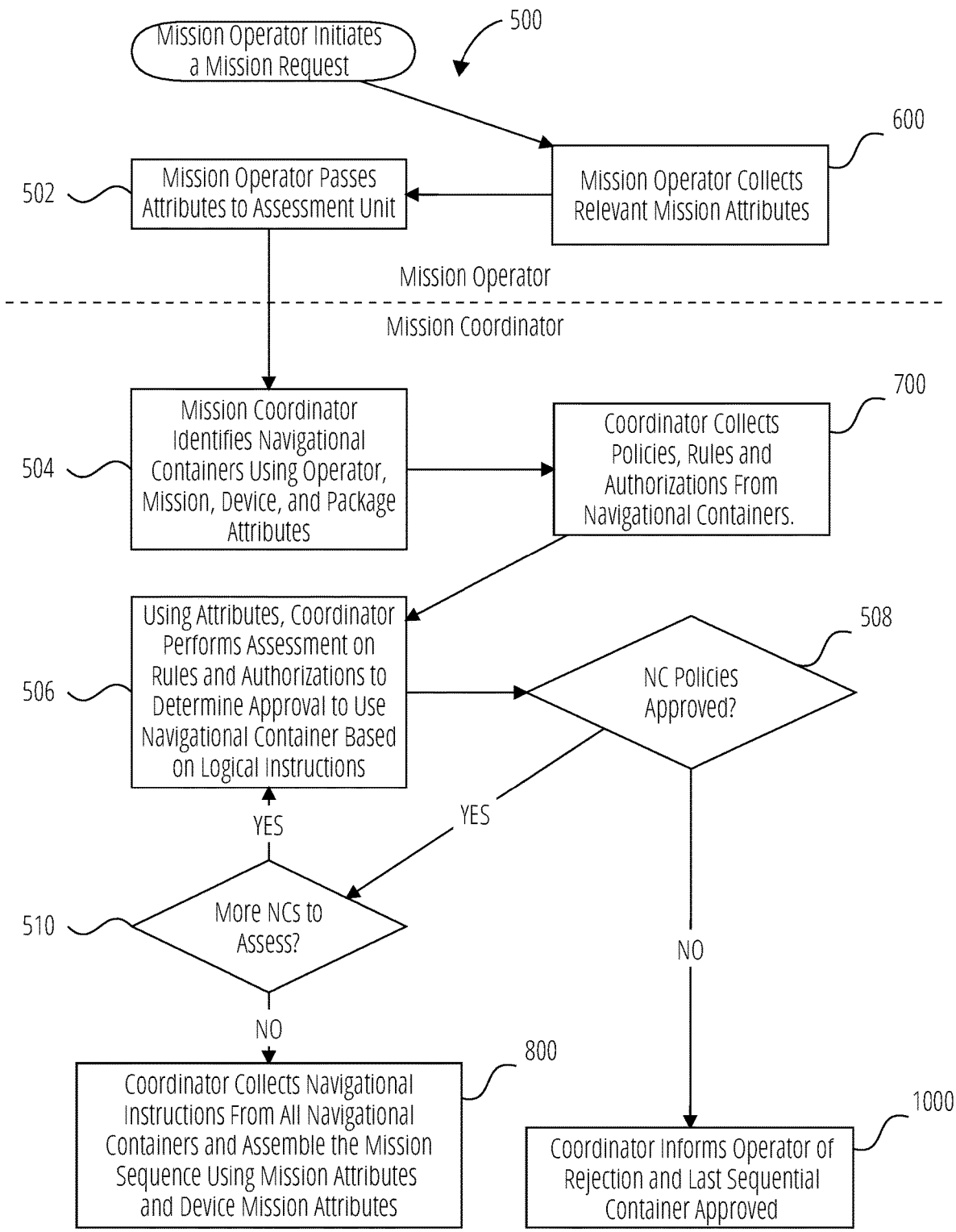
FIG. 5 illustrates steps of initiating a mission request 500 in accordance with one embodiment.

FIG. 5 illustrates initiating a mission request 500 in accordance with one embodiment. When initiating a mission request 500, a mission operator first collects relevant mission attributes 600. These are described in further detail with regard to FIG. 6. At step 502, the attributes of the mission are passed to an assessment unit. Process steps discussed herein fall under two broad categories—mission operator and mission coordinator. Afterwards the attributes are passed to the assessment unit, and further steps are largely carried out by a mission coordinator.

At step 504, navigational containers (NCs) are identified using mission operator attributes 602, mission attributes 604, device attributes (e.g., autonomous entity attributes) 606 and package or payload attributes 608. Next, the coordinator collects policies, rules, and authorizations 700 from navigational containers. This is described in further detail with regard to FIG. 7.

At step 506, a determination of approval to use a navigational container (e.g., navigational container #1 702) is made using relevant mission attributes, assessment on rules, and authorizations. At step 508, a decision is made to approve the policies of the navigational container or to reject. If the policies are rejected, step revising/abandoning the mission 1000 is initiated to inform the operator of rejection and of the last sequential NC that is approved.

If the policies are approved, step 510 follows. At step 510, if there are additional navigational containers to assess (e.g., navigational container #2 704 through navigational container # X 706), the process returns to step 506, and the assessment is repeated. If all of the navigational container policies have been approved, the coordinator collects the instructions from all of the navigational containers and proceeds to assembling a mission sequence 800.

Figure 6:
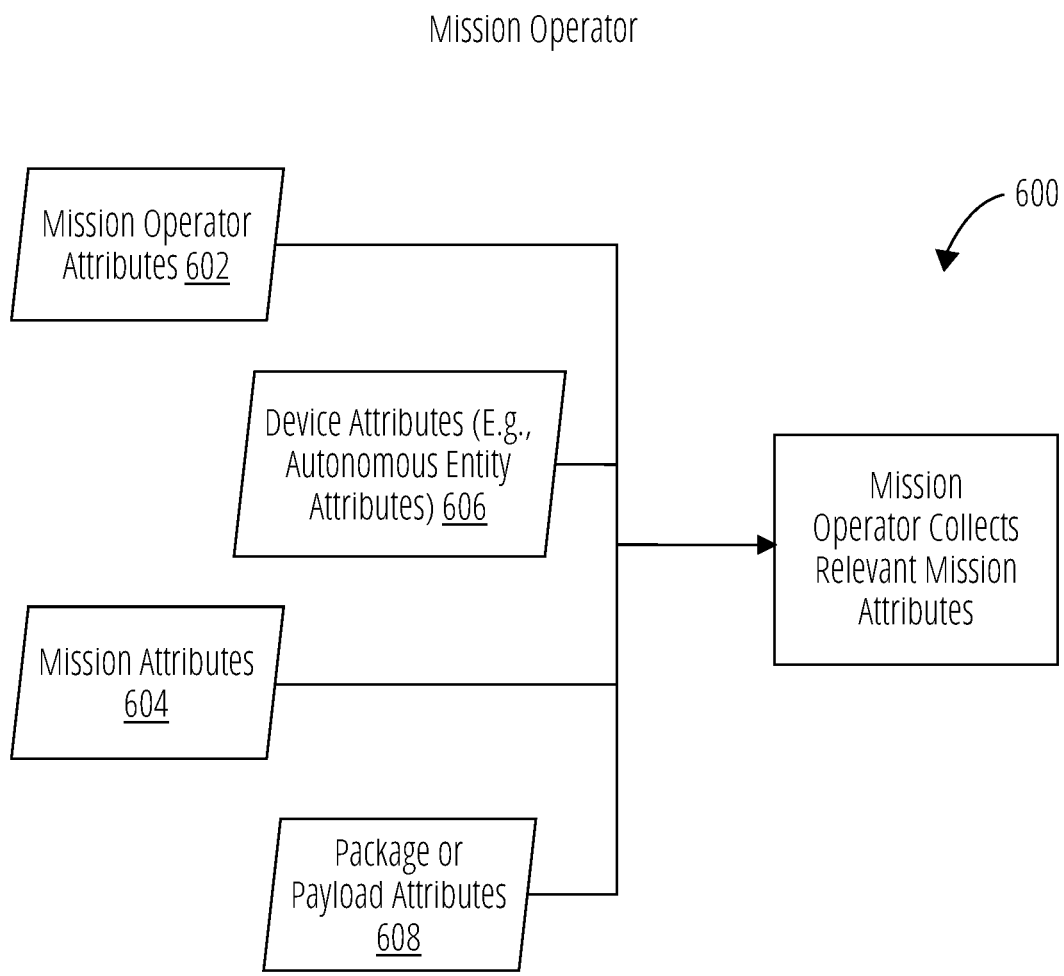
FIG. 6 illustrates relevant mission attributes 600 in accordance with one embodiment.

FIG. 6 illustrates relevant mission attributes 600 in accordance with one embodiment. These attributes comprise mission operator attributes 602, mission attributes 604, device attributes (e.g., autonomous entity attributes) 606, and package or payload attributes 608. The collected attributes are utilized as described with regard to FIG. 5.

Exemplary mission operator attributes 602 may comprise information relevant to items, such as, name, type, certification number, certification authority identity, authentication ID and encrypted password. Each item may fall under a mission rule value or a navigational container rule value. An exemplary name may comprise UPS™, FedEx™ or any name. An exemplary type may comprise commercial, government, military, medical or first responder. A person of ordinary skill in the art may enumerate any information relevant to the items to attribute the operator.

Exemplary device attributes (e.g., autonomous entity attributes) 606 may comprise information relevant to items, such as, mode, hybrid type, vendor, model number, sensors, sensor data match categories, payload interface category, payload deployment category, payload alignment category, landing pad profile, serial number, remote ID, battery serial number, battery maximum flight duration, noise rating, maximum payload weight, sensory device type, mathematical algorithms used for assessment and decisions, and recharging category. Each item may fall under a mission rule value or a navigational container rule value. A person of ordinary skill in the art may enumerate any information relevant to the items to attribute the device.

Exemplary mission attributes 604 may comprise information relevant to items, such as, mission ID, origination geocode, return destination geocode, interim destination geocode, destination geocode, origination navigational container identity, origination type, return destination navigational container identity, interim destination navigational container identity, payload navigational container identity, return destination type, destination address facility destination, date/time-window, category of mission, urgency category, and temporal security authorization ID. Each item may fall under a mission rule value or a navigational container rule value. A person of ordinary skill in the art may enumerate any information relevant to the items to attribute the mission.

Exemplary package or payload attributes 608 may comprise information relevant to items, such as, volume dimensions, weight, package material category exclusion, package format category, packaging interface, category of contents, and sensitivity. Each item may fall under a mission rule value or a navigational container rule value. A person of ordinary skill in the art may enumerate any information relevant to the items to attribute the payload.

Figure 7:
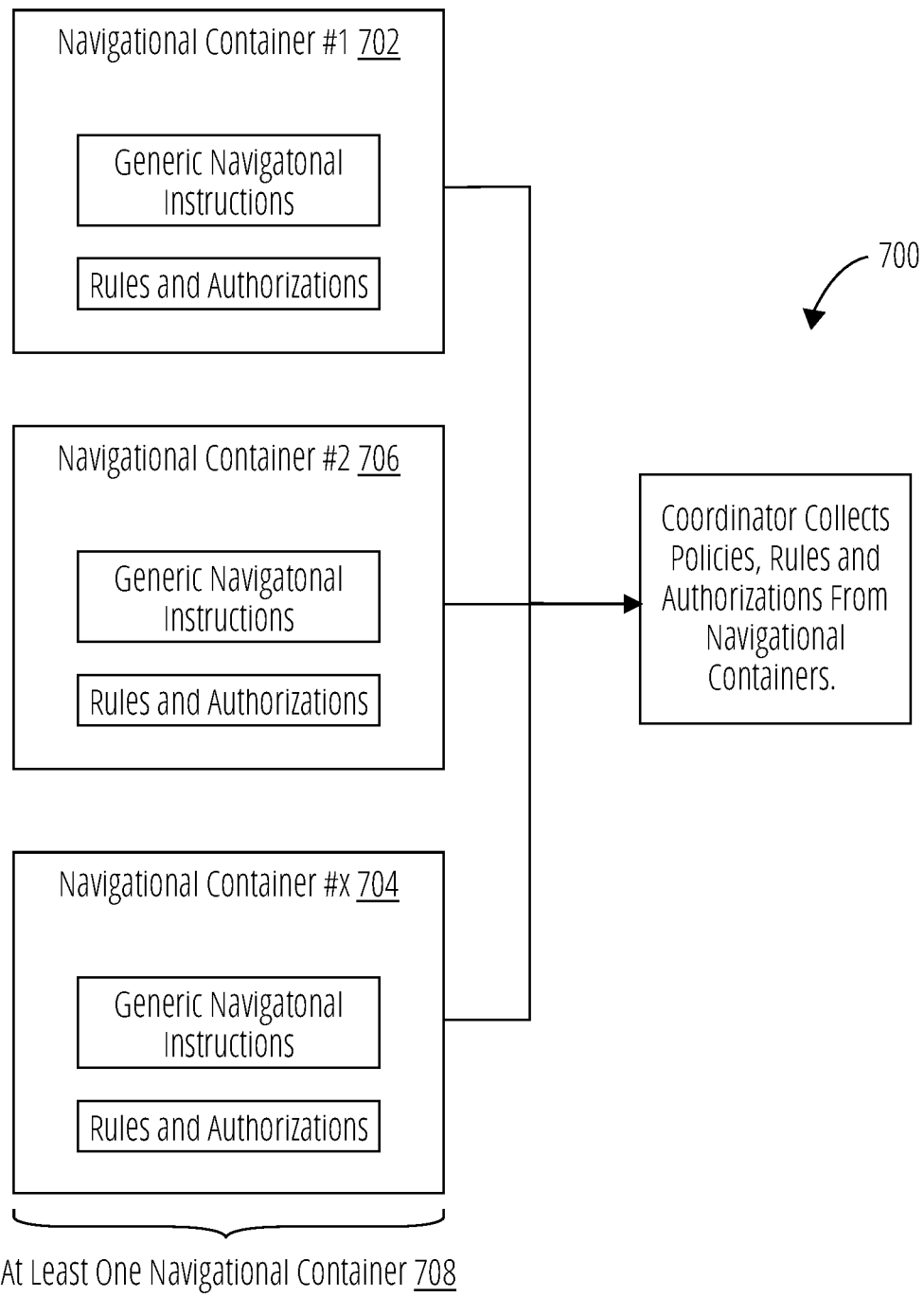
FIG. 7 illustrates collection of policies, rules, and authorizations 700 in accordance with one embodiment.

FIG. 7 illustrates the collection of policies, rules, and authorizations 700, showing a plurality of navigational containers, meeting the requirement for at least one navigational container 708, in accordance with one embodiment. Navigational container #1 702 comprises generic navigational instructions, and rules and authorizations. Navigational container #2 704 also comprises generic navigational instructions, and rules and authorizations. A plurality of navigational containers may be stacked together, such as, a third NC, a fourth NC, a fifth NC, up to navigational container # X 706, wherein X is a number stipulated by mission requirements. A plurality of NCs (NC #1 to NC # X) are thus combined when the coordinator collects the policies, rules, and authorizations 700.

Figure 8:
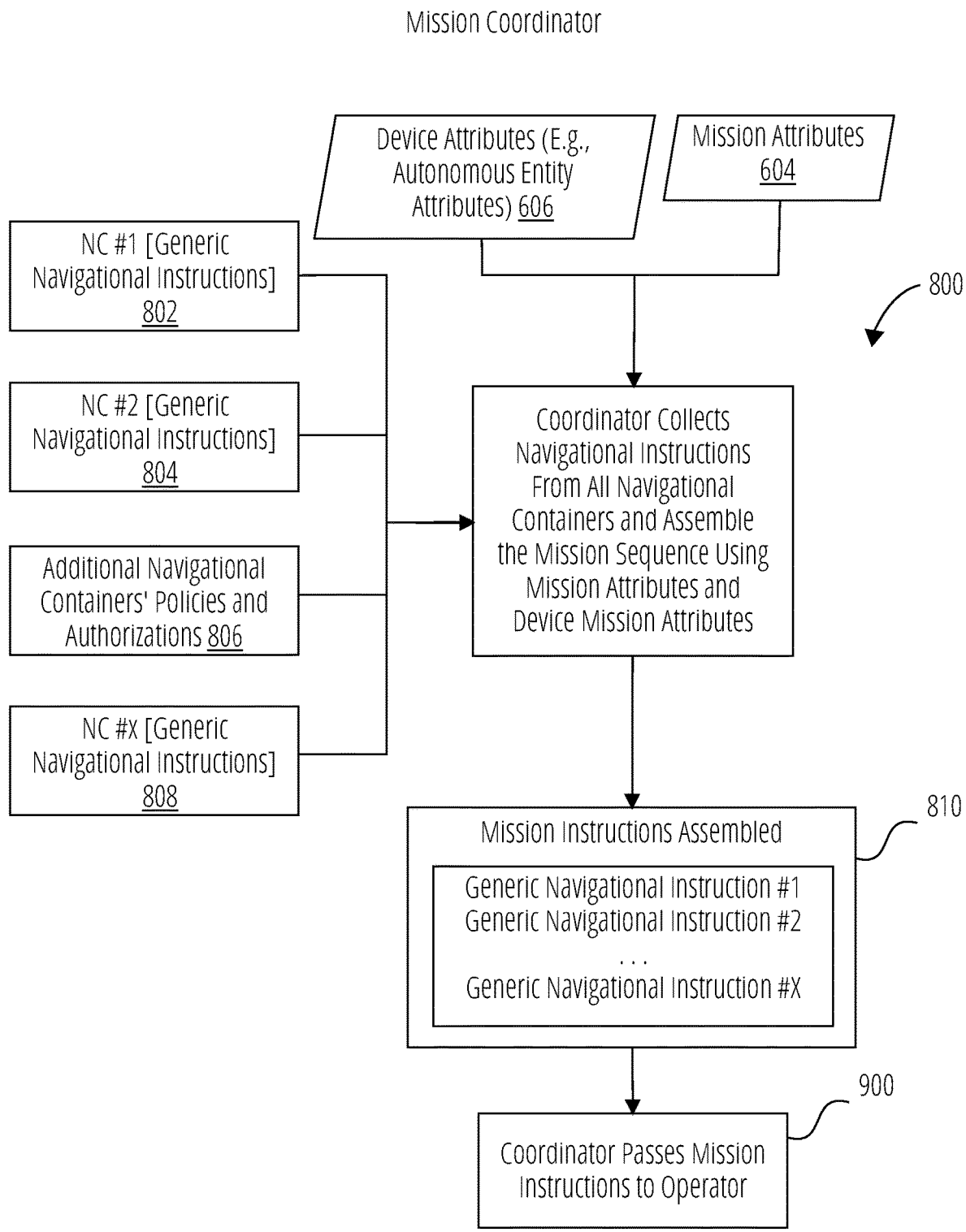
FIG. 8 illustrates assembling a mission sequence 800 in accordance with one embodiment.

FIG. 8 illustrates assembling a mission sequence 800 in accordance with one embodiment. After policies (policies #1 to policies # X) are approved as illustrated in FIG. 5, steps for assembling a mission sequence 800 begin. A mission sequence assembly is initiated by collecting navigational instructions from at least one or all navigational containers (NC #1 to NC # X) and by using mission attributes 604, and device attributes (e.g., autonomous entity attributes) 606.

Navigational instructions may be collected from NC #1 802, NC #2 804, along with additional navigational containers' policies and authorizations 806, up to, NC # X 808. At step 810, mission instructions are assembled by combining generic navigational instructions from NC #1 to NC # X. Finally, mission instructions are passed to the operator of the mission for example, the purpose of executing a mission 900. The time frames for each of the NCs is exclusively scheduled for a specific autonomous device or autonomous entity, and each of those time frames of the NCs is made unavailable to be scheduled by any other autonomous device or operator. In an embodiment, each navigational container is exclusively scheduled for use by the autonomous entity and mission operator after each navigational container in said mission has been approved for use by said mission operator. Executing a mission 900 is described in further detail with regard to FIG. 9.

Figure 9:
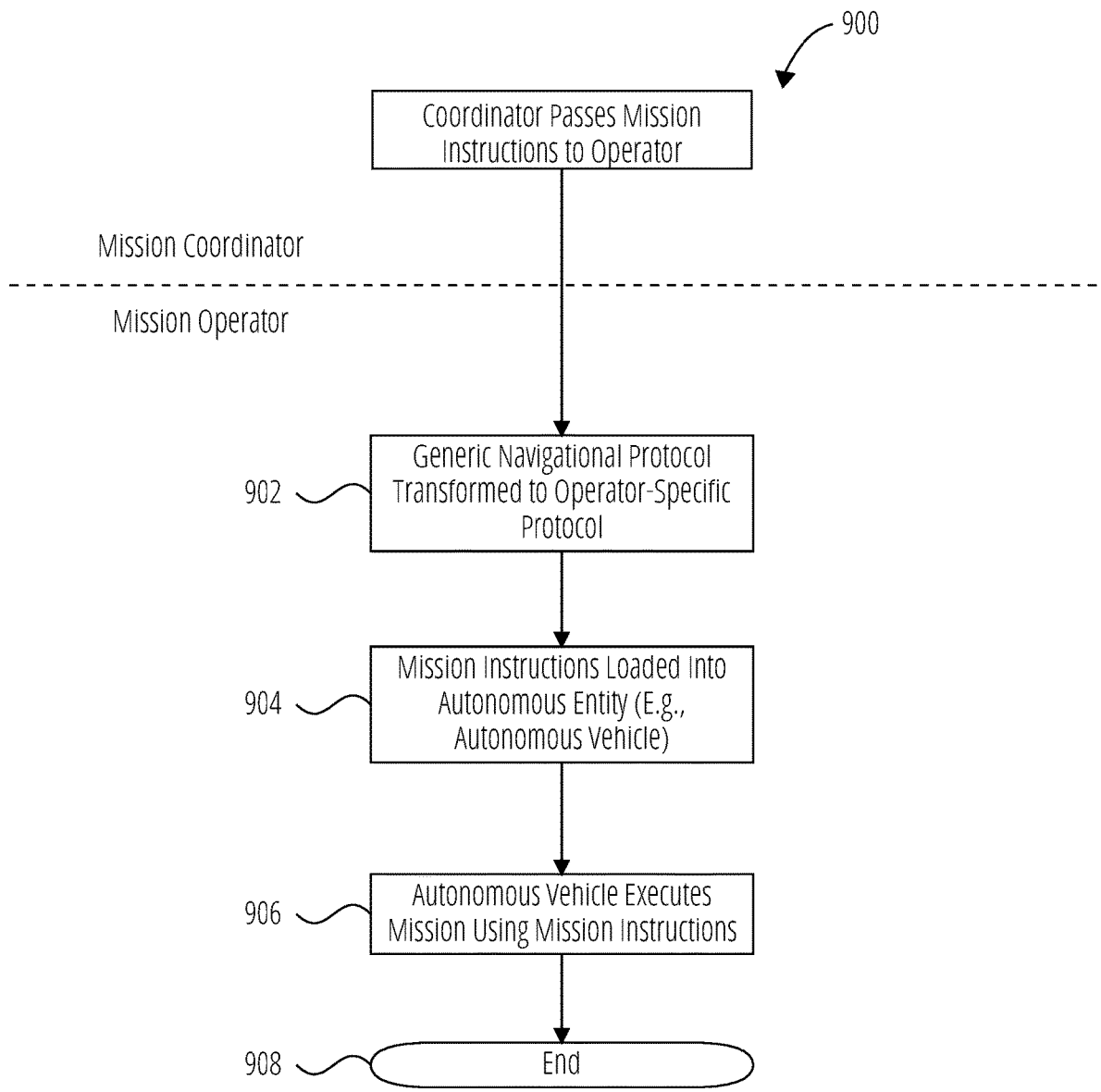
FIG. 9 illustrates steps of executing a mission 900 in accordance with one embodiment.

FIG. 9 illustrates executing a mission 900 in accordance with one embodiment. The process for executing a mission 900 may begin when the coordinator passes mission instructions to the operator. At step 902, a generic navigational protocol is transformed to a protocol that is specific to the operator or the operator's autonomous device.

At step 904, the transformed mission instructions are loaded into an autonomous vehicle. At step 906, the autonomous vehicle executes the mission using the transformed mission instructions. At step 908, the process ends.

Figure 10:
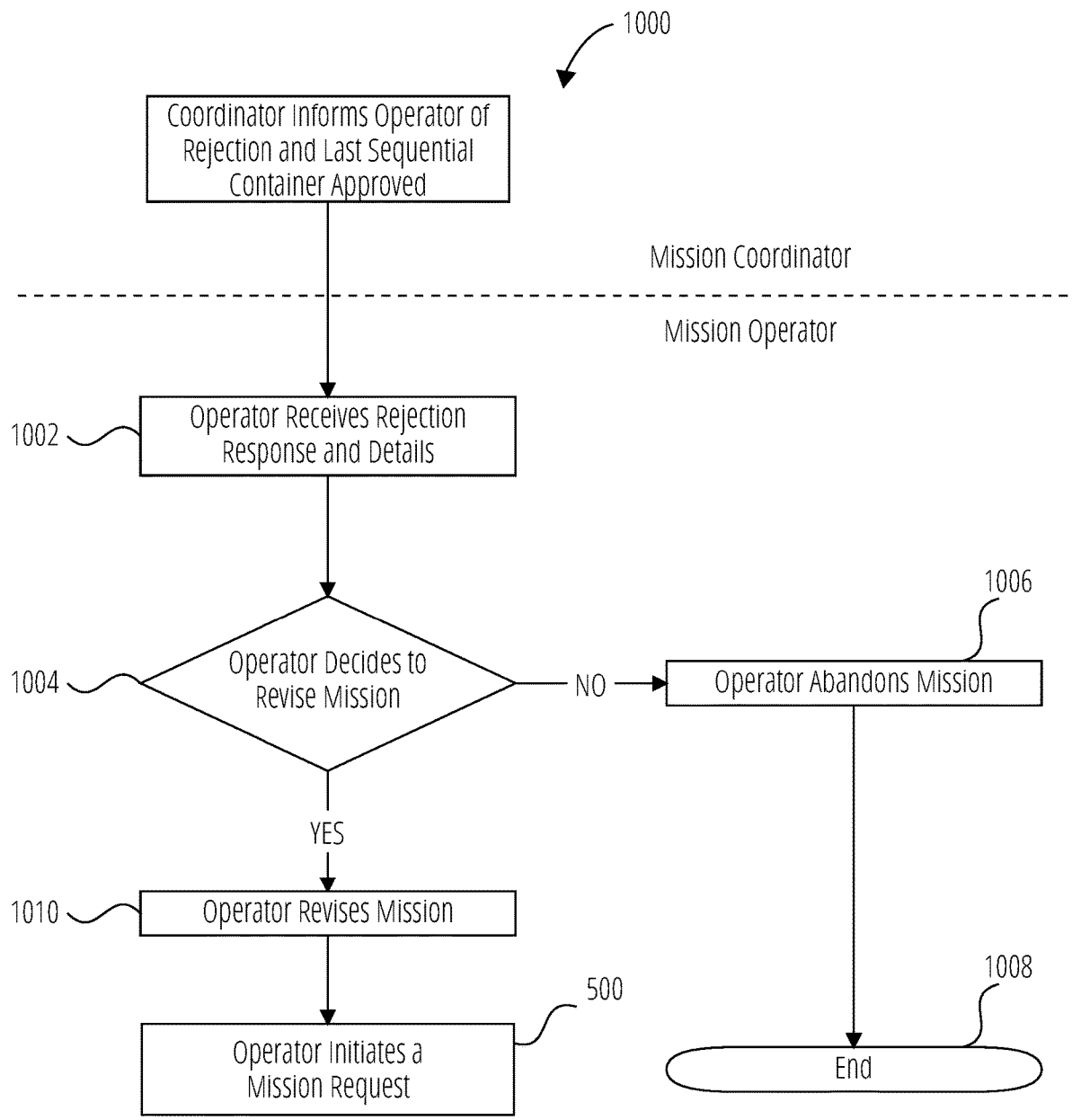
FIG. 10 illustrates revising/abandoning the mission 1000 in accordance with one embodiment.

FIG. 10 illustrates revising/abandoning the mission 1000 showing a process of rejection of a policy or policies in accordance with one embodiment. Revising/abandoning the mission 1000 begins when the operator of a mission is informed of a policies rejection and of the last sequential navigational container (NC), if any, that was approved. At step 1002, the rejection notice and details are received by the mission operator. At step 1004, the operator makes a decision on whether or not to revise the mission.

If the operator decides not to revise the mission, the operator abandons the mission at step 1006 and the process ends at step 1008. If the operator decides to revise the mission, the operator does so at step 1010. From here, the process returns to the steps for initiating a mission request 500 for the revised mission, as described with regard to FIG. 5.

Figure 11:
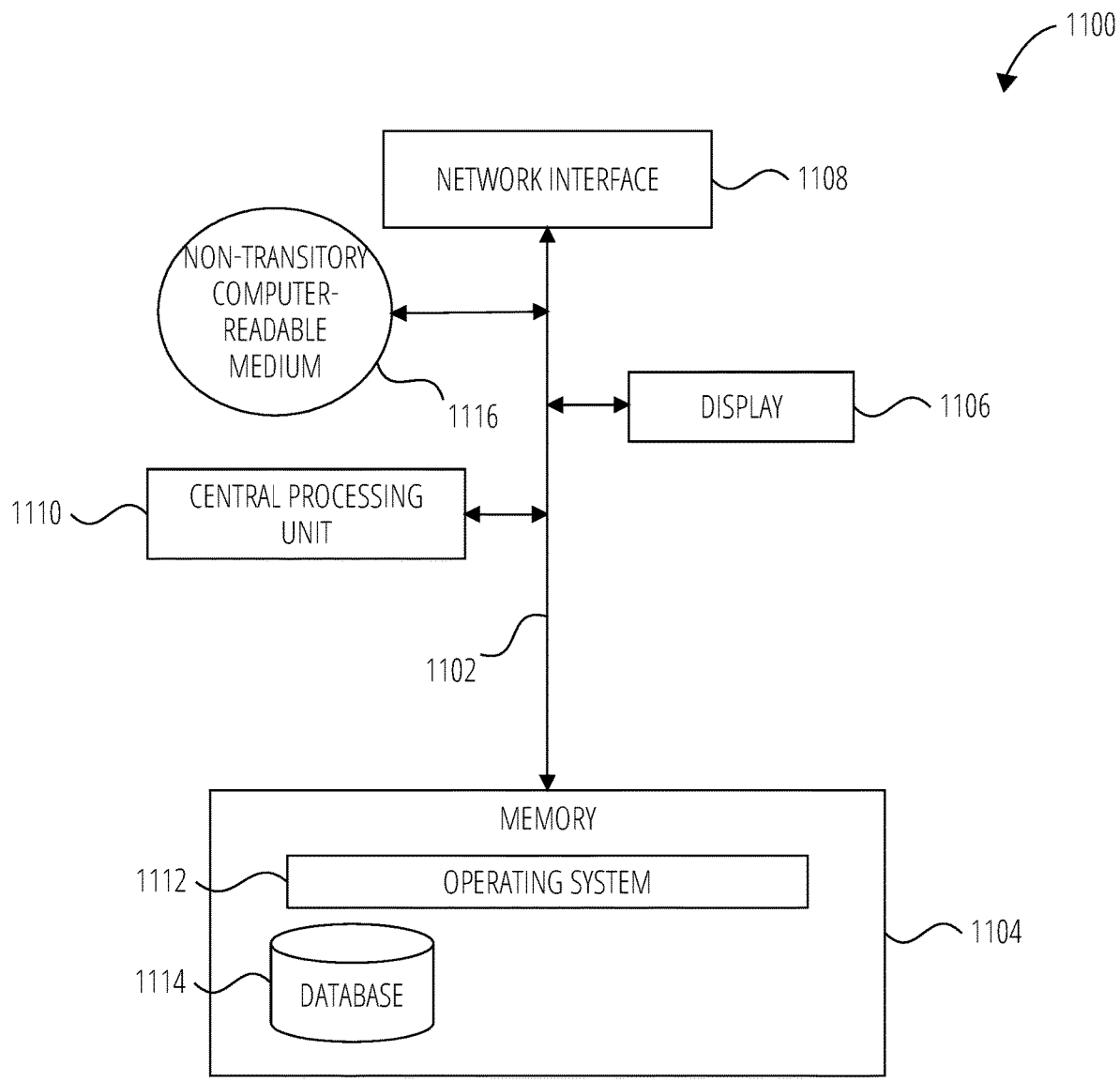
FIG. 11 illustrates a computer system 1100 in which the present invention may be practiced in accordance with one embodiment.

FIG. 11 illustrates several components of an exemplary system 1100 in accordance with one embodiment. The system 1100 comprises a bus 1102, a memory 1104, a display 1106, a network interface 1108, a central processing unit 1110, an operating system 1112, a database 1114, and a non-transitory computer-readable medium 1116.

In various embodiments, system 1100 may include a desktop PC, server, workstation, mobile phone, laptop, tablet, set-top box, appliance, or other computing device that is capable of performing operations such as those described herein. In some embodiments, system 1100 may include many more components than those shown in FIG. 11. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1100 may comprise one or more physical and/or logical devices that collectively provide the functionalities described herein. In some embodiments, system 1100 may comprise one or more replicated and/or distributed physical or logical devices.

In some embodiments, system 1100 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1100 includes a bus 1102 interconnecting several components including a network interface 1108, a display 1106, a central processing unit 1110, and a memory 1104.

Memory 1104 generally comprises a random access memory ("RAM") and permanent non-transitory mass storage device, such as a hard disk drive or solid-state drive. Memory 1104 stores an operating system 1112. These and other software components, such as a set of instructions that causes the system 1100 to execute the method disclosed herein, may be loaded into memory 1104 of system 1100 using a drive mechanism (not shown) associated with a non-transitory computer-readable medium 1116, such as a DVD/CD-ROM drive, memory card, network download, or the like.

Memory 1104 also includes database 1114. In some embodiments, system 1100 may communicate with database 1114 via network interface 1108, a storage area network ("SAN"), a high-speed serial bus, and/or via the other suitable communication technology. In some embodiments, database 1114 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Various logic functional operations described herein may be implemented in logic that is referred to using a noun or noun phrase reflecting said operation or function. For example, an association operation may be carried out by an "associator" or "correlator". Likewise, switching may be carried out by a "switch," selection by a "selector," and so on.

Figure 12:
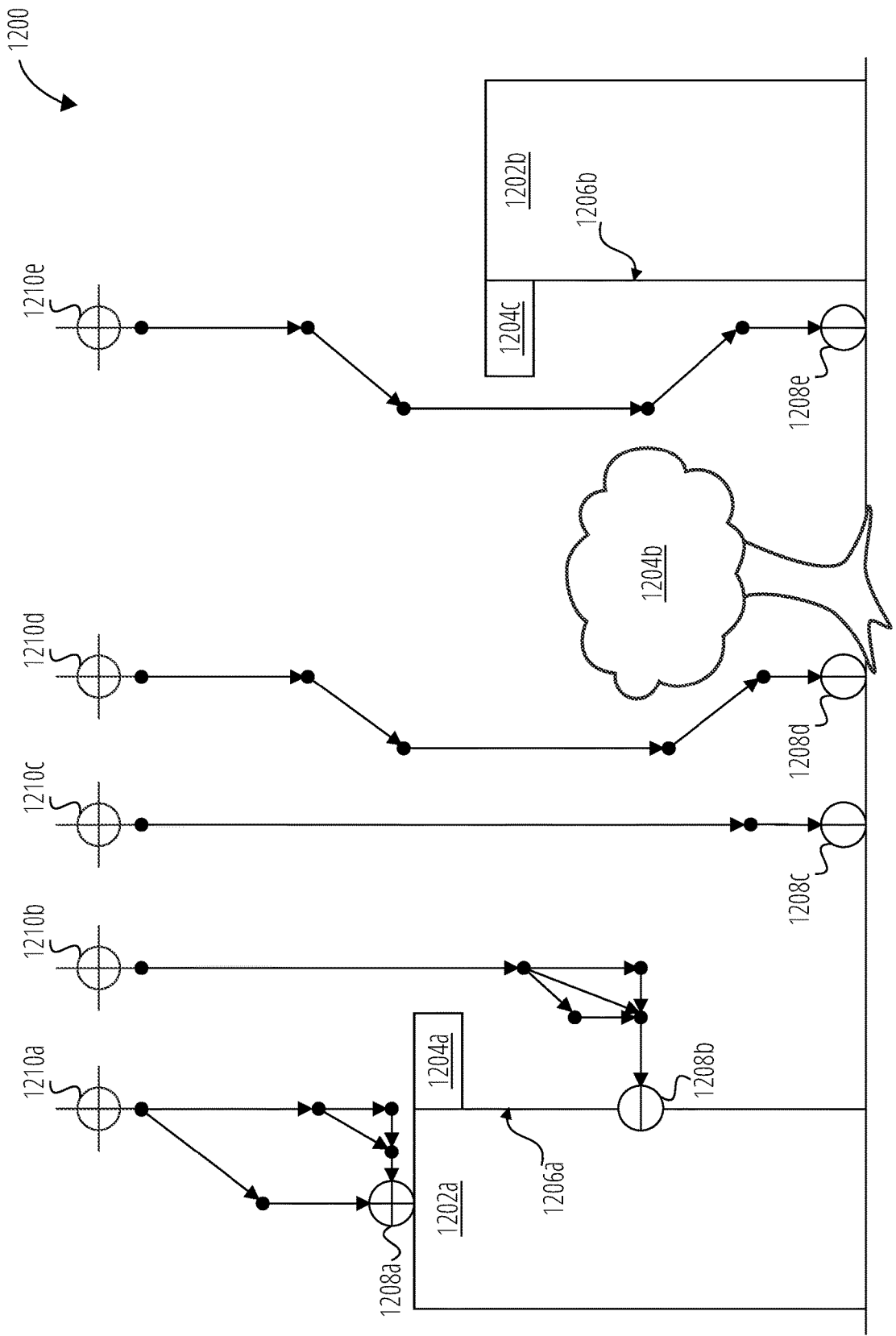
FIG. 12 illustrates a system 1200 in accordance with one embodiment.

FIG. 12 shows system 1200 providing various scenarios of a drone's approximate arrival to a precise destination, and the drone delivery approaches that may be registered in the clearing house unit. The system 1200 comprises roofs 1202*a* and 1202*b*, obstructing objects 1204*a*-1204*c*, vertical surfaces 1206*a* and 1206*b*, landing targets 1208*a*-1208*e*, and waypoints 1210*a*-1210*e*.

Landing target 1208*a* may be on a building top, unobstructed from waypoint 1210*a*. Landing target 1208*b* may be a wall portal vertically positioned on vertical surface 1206*a*, and may be obstructed from overhead from waypoint 1210*b* by obstructing object 1204*a*, which may be a building overhand. Landing target 1208*c* may be ground positioned and unobstructed from waypoint 1210*c*. Landing target 1208*d* may be ground positioned and obstructed from waypoint 1210*d* from overhead by obstructing object 1204*b*, which may be a tree. Landing target 1208*e* may be ground positioned and may be obstructed from overhead from waypoint 1210*e* by obstructing object 1204*c*, which may be a building overhang.

The method and apparatus in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

What is claimed is:

1. A system for implementing a mission, the system comprising:
an autonomous entity;
a mission operator;
an assessment unit;
at least one navigational container;
a processor; and
a memory storing instructions that, when executed by the processor, configure the system to:
  initiate, by the mission operator, a request for routing authorization and routing instructions prior to engaging said mission or mission segment;
  collect, by the mission operator, relevant mission attributes, wherein the relevant mission attributes are selected from mission operator attributes, initial location attributes, destination attributes, autonomous entity attributes, and payload attributes;
  pass the relevant mission attributes to the assessment unit;
  identify the at least one navigational container, by a mission coordinator,
    wherein the at least one navigational container is either a hub navigational container or a spoke navigational container,
    wherein each of a first navigational container and a last navigational container are comprised of the hub navigational container,
    wherein the hub navigational container is at least one of an interface between spoke navigational containers and a decision point along the mission configured to provide at least one of changes to the navigational instructions and changes to mission instructions,
    wherein the spoke navigational container is the navigational container used between two of the hub navigational containers and includes information necessary for the autonomous entity to navigate between the two of the hub navigational containers,
    wherein relevant mission attributes of the hub navigational container and relevant mission attributes of the spoke navigational container are alterable in view of data generated during a current mission or during a different mission, and
    wherein at least one hub navigational container is the decision point and is connected to more than one spoke navigational containers that are downstream from the at least one hub navigational container, wherein the decision point determines which of the more than one spoke navigational containers to follow,
  the navigational containers defined by:
    an initiating boundary;
    a terminating boundary, wherein the terminating boundary includes a path comprising a direction;
    navigational instructions between the initiating boundary and the terminating boundary, wherein the navigational instruction include at least one of:
      the direction between the initiating boundary and the terminating boundary;
      a range of time to pass between the initiating boundary and the terminating boundary; and
      a range of speed of transit between the initiating boundary and the terminating boundary;
    a navigational approach associated with the terminating boundary;
    a destination path associated with the navigational approach;
    the relevant mission attributes, wherein the at least one navigational container includes a unique collection of data; and
    guidance on alternative navigational containers to utilize if the autonomous entity is incapable of transiting through the terminating boundary,
    wherein at least one of the data generated during the mission and the guidance on alternative navigational containers alters an outcome of the at least one navigational container, and
    wherein the relevant mission attributes of the hub navigational container and the relevant mission attributes of the spoke navigational container are alterable in view of data generated during the current mission, during the different mission, or missions scheduled or underway in an adjacent location and time period;
  collect, by the mission coordinator, rules and authorizations from the at least one navigational container; and
  execute, by the mission coordinator, an assessment of the at least one navigational container using the assessment unit, wherein the assessment unit includes logical instructions to determine if the at least one navigational container is available during a requested time, wherein the logical instructions comprise:
    assess, by the mission coordinator, using the initial location attributes, the destination attributes, the rules and the authorizations if the rules and the authorizations are approved for the mission using the at least one navigational container, wherein the mission includes operations of the autonomous entity;
    on condition that the at least one navigational container is approved for the mission:
      collect, by the mission coordinator, navigational instructions from the at least one navigational container to assemble the mission instructions;
      assemble, by the mission coordinator, the mission instructions; and
      send, by the mission coordinator, the mission instructions to the mission operator; and
    on condition that the assessment does not approve the at least one navigational container for the mission:
      send, by the mission coordinator, a rejection response to the mission operator.

2. The system of claim 1, wherein the mission instructions are assembled using a plurality of generic navigational instructions, wherein each of said plurality of generic navigational instructions is associated with approval rules.

3. The system of claim 1, wherein the autonomous entity is an autonomous vehicle, wherein said autonomous vehicle is a terrestrial or aerial vehicle.

4. The system of claim 1, wherein the memory storing the instructions that, when executed by the processor, configure the system further includes:
  schedule, exclusively, each navigational container for use by the autonomous entity and the mission operator after each navigational container in said mission has been approved for use by said mission operator.

* * * * *